Patented Apr. 15, 1941

2,238,141

UNITED STATES PATENT OFFICE 2,238,141

PROCESS OF STABILIZING COMPOSITE ARTICLES OF CELLULOSE MATERIAL AND NEOPRENE BY THE ADDITION OF FLUORIDES AND PRODUCTS RESULTING THEREFROM

Herbert W. Walker, Woodstown, N. J., assignor to E. I. du Pont de Nemours & Company, Wilmington, Del., a corporation of Delaware No Drawing. Application April 29, 1938,
Serial No. 205,011

15 Claims. (Cl. 91—68)

This invention relates to articles comprising organic materials and polymers of halogen containing dienes and to their manufacture. More particularly, it relates to a method for retarding the deterioration of organic materials impregnated or coated with polymers of halogen containing butadienes. Still more particularly it relates to the stabilization of cellulose, cellulose products and chemical derivatives of cellulose that are treated with polymers of chloro-2-butadiene-1,3 (hereinafter for convenience also called chloroprene).

Cellulose products are hydrolyzed or caused to deteriorate by hydrochloric acid. These products include woven and knitted fabrics or cotton, rayon, celanese, linen, ramie, jute and the like, cotton or rayon filaments, paper and cardboard. When these materials are impregnated or coated with chloroprene polymers they deteriorate more rapidly than the same materials that have not been treated with the polymers. This deterioration is accelerated by sunlight and heat. In general, the higher the temperature of the storage or service conditions of the treated cellulose product in the presence of air or oxygen, the greater the rate of deterioration. Humidity also promotes the deterioration. The deterioration consists of a loss of tensile strength and frequently the development of stiffness to a brittle condition in which cracking or breaking on bending takes place. This tendering is believed to be caused by hydrochloric acid that is liberated from the chloroprene polymers when they undergo oxidation. The rate of oxidation is reduced by the use of selected antioxidants but even in the presence of the most efficient oxidation inhibitors, the tendering is severe.

It is an object of this invention to provide a method for retarding the deterioration of cellulose, cellulose products and chemical derivatives of cellulose which takes place when such materials are exposed to polymers of halogenated butadienes. A further object is to produce composite articles comprising polymers of halogenated dienes and cellulose, or cellulose products or chemical derivatives of cellulose which show an improved resistance to deterioration. A more specific object is to provide a method for retarding the deterioration of cellulose, cellulose products and chemical derivatives of cellulose which takes place when such materials are exposed to polymers of chloro-2-butadiene-1,3 and to produce composite articles comprising the polymer and the cellulose material which show an improved resistance to deterioration. A further object is to produce composite articles comprising polymers of chloro-2-butadiene-1,3 and cellulose or cellulose products or chemical derivatives of cellulose which show an improved resistance to loss of tensile strength on exposure to air or oxygen. A still further object is the production of composite articles of the type described which exhibit a decreased tendency to develop brittleness. Other objects will appear hereinafter.

These objects are accomplished by having present in composite articles comprising polymers of chloroprene and cellulose or cellulose products or derivatives of cellulose a fluoride which is capable of reacting with hydrochloric acid. Such composite articles include among others both articles in which the cellulose, or product or derivative is coated with chloroprene polymer and articles in which the cellulose material is impregnated with chloroprene polymer. The coating and impregnation may be effected, for example, by the methods disclosed in U. S. Patent No. 1,967,863. Such treatment of cellulose materials may be to waterproof them, or to make them resistant to oils, or to bond strands or filaments together, or to flameproof them, or to eliminate slippage as in carpets, or to insulate or for a variety of other purposes.

The polymers may, for example, be used to impregnate or to coat cellulose materials in the form of plastic material as in frictioning or skim coating on a calender; in the form of a cement as in spreading a heavy cement with a spreader or in dipping the material to be impregnated or coated into a relatively thin cement; and in the form of a latex. In whatever form the chloroprene polymer may be applied, it may or may not be compounded with compounding ingredients such as metallic oxides, softening agents, carbon blacks, clays and other pigments.

Cellulose material treated with chloroprene polymer in whatever form may be most suitable for a given purpose, is protected from deterioration by the presence of a fluoride. In some cases the fluoride is mixed as a dry powder with the chloroprene on a rubber mill or in an internal mixer. In other cases the fluoride may be added directly to latices of chloroprene polymer as a water solution if it is soluble in water. The chloroprene polymer treated with the fluoride is then used in the conventional manner to impregnate or to coat cotton fabrics, paper and the like. The cellulose material may first be treated with the fluoride before the chloroprene polymer is applied by immersing it in a water solution or dispersion of the fluoride and permitting it to dry before impregnating or by precipitating an insoluble fluoride upon it.

The varied embodiments of this invention are illustrated in the following examples. It should be understood, however, that these examples are intended to be illustrative only and are not intended to limit the scope of the invention. The term "parts," whenever hereinafter used, signifies parts by weight.

To illustrate the addition of salts of hydrofluoric acid to plastic chloroprene polymer after the manner of other compounding ingredients and to furnish evidence of the increased resistance toward tendering of cotton fabric obtained by such an addition, the following example is given:

EXAMPLE 1.—*Effect of fluorides in cements*

One hundred parts of chloroprene, substantially free from acetaldehyde, monovinyl acetylene, divinyl acetylene, methyl vinyl ketone, and dichloro-1,3-butene-2, were treated with 0.5 part of thioglycolic acid and 0.03 part hydrogen sulfide and the mixture was thoroughly emulsified in 400 parts of a 1% solution, in water, of the sodium salts of the sulfate esters of a mixture of cetyl and stearyl alcohols with the addition, if necessary, of sufficient dilute hydrochloric acid to acidify the emulsion to Congo Red. Emulsification was carried out by repeated passage thru a high speed centrifugal pump. The resulting emulsion was allowed to polymerize at 40° C. until the density of the latex at 20° C. was 1.031.

The polymerized chloroprene remained dispersed forming a synthetic latex. When the specified density was reached the dispersion was treated with 1 part of phenyl beta naphthylamine and 1 part of tetramethyl thiuram disulfide dispersed in 10 additional parts of the emulsifying solution with the aid of 8 parts of benzene. Coagulation was also brought about by adding solid sodium chloride slowly with constant agitation until coagulation was complete. The dispersing agent and salt were removed from the polymer by washing the coagulum on corrugated uneven speed rolls with water at 50° C. until foaming had practically ceased. The product was finally dried by milling on a rubber mill with smooth rolls internally cooled with water, so that the temperature of the polymer did not exceed about 40° C.

The resulting polymer was then compounded on a rubber mill as follows:

| | Formula number | |
|---|---|---|
| | 1 | 2 |
| Chloroprene polymer | 100 | 100 |
| p(p-Toluene sulfonyl amino) phenyl p-tolyl amine | 2 | 2 |
| FF wood rosin | 10 | 10 |
| MgO | 10 | 10 |
| ZnO | 10 | 10 |
| Sodium fluoride | | 10 |

Cements of the compounded polymer were made by dispersing 100 parts of each of the batches of compounded material in 900 parts of benzene. Into each cement was dipped three times a piece of bleached cotton fabric, allowing the material to dry after each successive dip. Portions of the impregnated fabrics were hung in a constant temperature air oven at 125° C. and examined for failure from time to time. Table I gives the results obtained.

*Table I*

| Fabric treated with cement made from Formula No.— | Condition of fabric after aging at 125° C. for 183 hours |
|---|---|
| 1 | Brittle, cracks on bending. |
| 2 | Flexible. |

Salts of hydrofluoric acid may be added as water solutions or water dispersions to compounded and uncompounded latices of chloroprene polymer. These salts are deposited on or within the cellulose product treated with the latices together with the chloroprene polymer and other compounding ingredients that may be present. The effect of certain fluorides on the tendering of cellulose products impregnated and coated with chloroprene polymer from latices is illustrated by the following examples:

EXAMPLE 2

One hundred parts of chloroprene, substantially free from acetaldehyde, monovinyl acetylene, divinyl acetylene, methyl vinyl ketone, and dichloro-1,3-butene-2, and in which 0.5 part of sulfur had been dissolved, was emulsified by gradual addition, with the rapid mechanical agitation secured by repeated passage thru a centrifugal pump, to 100 parts of a solution, in water, of 4% of C-cetyl betaine and 1% of the sodium salt of the acid obtained by condensing napthalene sulfonic acids with formaldehyde according to U. S. Patent No. 2,046,757. The dispersion was then maintained, in a vessel which could be externally heated or cooled, at a temperature of 40° C. until polymerization was substantially complete as was shown by the rise in density of the dispersion (measured at 20° C.) to about 1.10. When polymerization was substantially complete the latex was treated with 1 part of ammonia and 1 part of ethyl beta naphthylamine.

A 100 part portion of the stabilized latex was treated with 25 parts of 10% potassium fluoride solution and used to impregnate a strip of bleached cotton fabric by a single passage of the fabric thru the latex. The treated fabric, together with fabric impregnated with the latex without potassium fluoride were aged and tensile determinations made on strips 14 mm. in width. After three hours at 125° C. the fabric sample without potassium fluoride had a tensile strength of 6.5 kg., whereas the potassium fluoride treated sample after twenty-four hours had a tensile strength of 17.7 kg.

EXAMPLE 3

One hundred parts of chloroprene, substantially free from acetaldehyde, monovinyl acetylene, divinyl acetylene, methyl vinyl ketone, and dichloro-1,3-butene-2, and to which 0.5 part of sulfur, 0.5 part of paraffin and 2.0 parts of hexahydrophenol had been added, was emulsified by gradual addition, with the rapid mechanical agitation secured by repeated passage thru a centrifugal pump, to 100 parts of a solution, in water, of 2% of the sodium salts of the sulfate esters of a mixture of straight chain aliphatic alcohols, with an average chain length of about 13 carbon atoms made from cocoanut oil. The dispersion was then maintained, in a vessel which could be externally heated or cooled, at a temperature of 40° C. until polymerization was substantially complete as was shown by the rise in density of the dispersion (measured at 20° C.) to about 1.10. When polymerization was substantially complete the latex was treated with 0.5 part of ammonia, 1.25 parts of ethyl beta naphthylamine, 1 part of diphenyl paraphenylene diamine and 1 part of C-cetyl betaine. Portions of the stabilized latex were treated respectively with varying amounts of different fluorides and used to impregnate a strip of bleached cotton fabric. The treated samples of fabric, together with fabric impregnated with the latex to which no fluoride was added, were aged and tested as in Example 2. The results obtained are given in Table II.

Table II

| Fluoride added to latex | Amount per 100 pts. of latex | Tensile strength in kg. after aging at 125° C. for 10 hours |
|---|---|---|
| None | | 7.9 |
| KF | 0.5 pt. (as 25% aqueous sol.) | 16.0 |
| KHF$_2$ | 3.0 pts. (as 25% aqueous sol.) | 17.6 |
| NH$_4$HF$_2$ | 3.0 pts. (as 25% aqueous sol.) | 14.5 |
| PbF$_2$ | 10.0 pts. (dispersed in alkaline casein solution) | 17.5 |
| AlF$_3$ | 1.5 pts. (as water solution) | 9.5 |

(The original tensile strength varied from 20 to 21 kg.)

EXAMPLE 4

Bleached cotton fabric was impregnated with the latex described in Example 3 compounded with 5 parts of ZnO per 100 parts of chloroprene polymer. Another piece of fabric was impregnated with a portion of this latex compounded with ZnO to which were added 10 parts of potassium fluoride on the basis of the chloroprene polymer. The two treated fabrics were aged at 150° C. in an air oven and the tensile strength of a strip 14 mm. wide measured after varying time intervals. The results obtained are given in Table III.

Table III

| Compounding ingredients used in latex to impregnate cotton | Tensile strength in kg. after aging at 150° C. for— | | |
|---|---|---|---|
| | 0 hrs. | 10 hrs. | 24 hrs. |
| ZnO | 21.2 | 8.5 | 5.3 |
| ZnO+KF | 19.1 | 19.5 | 17.4 |

EXAMPLE 5

Rayon and celanese fabric, bond typewriting paper and light weight cardboard were impregnated with the latices containing ZnO and ZnO in combination with potassium fluoride as used with the cotton fabric in Example 4. After aging in an air oven to 150° C. tensile strength measurements were made on strips of the respective materials 14 mm. in width. The results are recorded in Table IV.

Table IV

| Impregnated material | Compounding ingredients used in latex | Tensile strength in kg. after aging at 150° C. for— | | |
|---|---|---|---|---|
| | | 0 hrs. | 10 hrs. | 24 hrs. |
| Rayon | ZnO | 19.2 | 9.8 | 2.4 |
| Do | ZnO+KF | 16.6 | 16.8 | 12.0 |
| Celanese | ZnO | 19.0 | 16.3 | 9.0 |
| Do | ZnO+KF | 18.3 | 14.9 | 11.7 |
| Bond paper | ZnO | 3.6 | 2.4 | 2.5 |
| Do | ZnO+KF | 3.5 | 3.6 | 3.1 |
| Cardboard | ZnO | 15.2 | 13.2 | 10.7 |
| Do | ZnO+KF | 14.5 | 15.5 | 12.6 |

It will be noted that the latex made with a solution of the sodium salt of the sulfate ester of higher alcohols as in Examples 3, 4, and 5 had added to it 1% of C-cetyl betaine. C-cetyl betaine or some similar agent is added to prevent this type of latex from coagulating when the water solution of a fluoride is added to the latex as disclosed in a copending application of Walker and Wilder, Ser. No. 216,587, filed June 29, 1938.

The effect of pretreating cellulose products with a water solution of a soluble fluoride before impregnating with chloroprene polymers is illustrated by the following examples.

EXAMPLE 6

Cotton fabric was dipped into a 5% water solution of potassium fluoride, pressed between layers of absorbent paper, and dried. The fabric so treated was then impregnated with a cement made with chloroprene polymer prepared as in Example 1 and compounded according to Formula 1 in Example 1. Untreated fabric was similarly impregnated with the same cement. Exposure to the action of heat in a 125° C. oven and to light from a carbon arc fadeometer gave the results shown in Table V.

Table V

| | Tensile strength in kg. after aging in— | | |
|---|---|---|---|
| | 125° C. oven | | Fadeometer 100 hrs. |
| | 0 hrs. | 183 hrs. | |
| Potassium fluoride treated fabric | 19.1 | 18.2 (flexible) | 17.8 |
| Untreated fabric | 20.4 | 9.9 (brittle) | 12.9 |

EXAMPLE 7

Cotton fabric treated and untreated with potassium fluoride as in Example 6 was impregnated with the chloroprene polymer latex not containing potassium fluoride described in Example 3. The aging results are given in Table VI.

Table VI

| | Tensile strength in kg. after aging in— | |
|---|---|---|
| | 125° C. oven 24 hours | Fadeometer 24 hours |
| Potassium fluoride treated fabric | 17.2 | 17.8 |
| Untreated fabric | 2.6 | 2.6 |

As disclosed above, lead fluoride and other insoluble fluorides may be used in place of potassium fluoride to give protection to polymer-coated fabric. The use of insoluble fluorides is particularly preferred since they are less readily removed by washing. Thus they may be dispersed in the latex or, better, precipitated upon the fabric before impregnation, thus giving a uniform distribution within and on the fibers. Their insolubility adapts them especially to treatment of the cellulose material prior to application of the polymer, particularly where it is deposited from a latex. The following example further illustrates the use of insoluble fluorides.

EXAMPLE 8

Cotton was impregnated with lead fluoride by first saturating with a 10% solution of lead acetate, removing the excess of solution, running the treated cotton thru a 10% potassium fluoride solution, rinsing with water, and drying. The treated fabric was then coated with the latex not containing fluoride used in Example 3 above and aged at 125° C. for 28 hours along with an untreated sample of fabric, coated with the same latex. The treated sample had a tensile strength of 14.0 kg. while the untreated had a strength of only 6.3 kg. Another portion of treated and impregnated fabric was soaked in water at 85° C. for 5 hours, then dried and aged as above. The tensile strength was 10.7 kg.

In addition to the specific fluorides mentioned in the examples the water soluble fluorides of other alkali metals such as cesium and lithium, or of silver, tin or antimony may be used. Ammonium fluoride will be found to be operative. Likewise, other water insoluble or sparingly soluble fluorides than lead fluoride may be used as a compounding ingredient in plastic chloroprene polymer or as an aqueous dispersion in chloroprene polymer latex or to pretreat the cellulose material. In general, as disclosed above, those fluorides which react with hydrochloric acid will be found to be operative. Such fluorides as those of aluminum, chromium, and zirconium are said to be less reactive toward hydrochloric acid and would be found to be less effective than the fluorides which readily react with hydrochloric acid.

The quantities of a fluoride that may be used may vary between wide limits, for example, from about 0.5% or less to about 25% of the chloroprene polymers used for impregnation or coating purposes. The protective action, for a given degree of dispersion of the fluoride in the plastic chloroprene polymer or latex or on the cellulose product, increases with the amount of fluoride used. However, a small quantity of a fluoride finely subdivided and well dispersed will be more effective than larger amounts of material improperly dispersed. As is shown in the above examples, the fluoride may be incorporated in any desired manner.

A preferred compound is potassium fluoride. A practical use of a fluoride as a cellulose nontendering agent is in a latex and potassium fluoride is adapted for obtaining a molecular dispersion in a latex. However, considerable impregnating work is done with fabrics using plastic chloroprene polymers and cements and for such operations sodium or lead fluoride may be preferable to potassium fluoride. This is because the sodium and lead fluorides are anhydrous and can be finely ground for good dispersion in the chloroprene polymer, whereas potassium fluoride normally exists as a hydrate and must be dehydrated before incorporating it as a solid into chloroprene polymer. Another preferred embodiment of the present invention, however, involves treatment of the cellulose material with a fluoride, as disclosed herein, prior to the application of the polymer. Such treatment is very effective in bringing the fluoride into intimate contact with the cellulose material which it is to protect and while preferably effected with an insoluble fluoride, it is also efficient with soluble fluorides even when the polymer is deposited from a latex as illustrated in Examples 6 and 7 above. To minimize the loss of soluble fluoride when polymer is deposited from a latex and at the same time gain the advantage of pretreatment, it will be found desirable to include in such latex the usual amount of fluoride even where pretreatment has been given. Preferred fluorides as a class are those which are solids at normal temperatures.

The chloroprene polymers used in the above examples are carefully identified by the method of preparation but it is not intended that this invention shall be construed to be limited to these particular types of chloroprene polymers. This invention includes within its scope the incorporation of fluorides into composite articles comprising any chloroprene polymer adapted to be used in the manufacture of composite articles. Moreover, altho the invention has been described with particular reference to chloroprene polymers, it includes within its scope the use of bromoprene or iodoprene polymers instead of chloroprene polymers. More specifically, the invention contemplates the use of suitable fluorides as deterioration retardants in composite articles comprising polymers of chloroprene prepared by polymerizing the chloroprene in the presence of another polymerizable material. As regards cellulosic materials this invention in its broad scope extends to the use of suitable fluorides to retard deterioration in any composite article, comprising polymers as disclosed above and cellulose, or cellulose products or chemical derivatives of cellulose in which the molecules include the characteristic cellulosic group. By "cellulose material" as used in both the specification and claims is meant any of the aforementioned materials, i. e., cellulose, cellulose products, or chemical derivatives of cellulose in which the molecules include the characteristic cellulosic group.

The fluorides are valuable protectorants for cellulose materials against the deteriorating action of hydrochloric acid liberated from oxidized chloroprene polymers because they themselves are inert with respect to cellulose and readily combine with hydrochloric acid to yield noninjurious reaction products. Soluble alkalis like the hydroxides, carbonates and phosphates neutralize this hydrochloric acid and exhibit protective action but they tend to promote oxidation of cellulose and are found to be less effective than the fluorides. Water insoluble basic compounds such as zinc oxide, calcium carbonate and the like, will take up hydrochloric acid and do not have the alkaline effect on oxidation, but they likewise are less effective than potassium fluoride. There is an advantage to be gained by using the fluoride in addition to these basic compounds.

A preferred embodiment, therefore, includes the joint use of fluorides and a water insoluble basic compound, such as zinc oxide, calcium carbonate, and the like. The incorporation of such compounds along with a fluoride as well as suitable amounts to use are illustrated in the above examples. The invention is not limited to the particular procedure disclosed in the examples, however, altho this procedure is preferred. The basic compound may be incorporated in any desired way and along with or before or after the fluoride and while the quantities of the basic compounds employed in the above examples are also preferred, the invention contemplates the use of both greater and less amounts than those specifically set forth.

The composite articles containing fluorides are suited to the same uses as are the articles without the fluorides altho by virtue of their resistance to deterioration they will perform in a much more satisfactory way. In addition, their resistance to deterioration adapts the products of the present invention to a much wider field of use, particularly from the commercial point of view.

It is apparent that many widely different embodiments of this invention may be made without departing from the spirit and scope thereof and, therefore, it is not intended to be limited except as indicated in the appended claims.

I claim:

1. A method for retarding the deterioration of a composite article comprising a cellulose material having a chloro-2-butadiene-1,3 polymer composition deposited upon it from an aqueous dispersion of the polymer which comprises incorporating potassium fluoride into the aqueous dispersion in an amount equal to about 0.5% to about 25%, by weight, based on the polymer, prior to depositing the polymer composition upon the cellulose material.

2. A method for retarding the deterioration of a composite article comprising a cellulose material having a chloro-2-butadiene-1,3 polymer composition deposited upon it in the absence of water which comprises incorporating sodium fluoride into the polymer composition in an amount equal to about 0.5% to about 25%, by weight, based on the polymer, prior to depositing the polymer composition upon the cellulose material.

3. A method for retarding the deterioration of a composite article comprising a cellulose material having a chloro-2-butadiene-1,3 polymer composition deposited upon it, which comprises depositing lead fluoride upon the cellulose material prior to depositing the polymer composition upon the cellulose material.

4. A composite article comprising bleached cotton fabric impregnated with a chloro-2-butadiene-1,3 polymer latex containing about 5%, by weight, based on the polymer, of zinc oxide and about 10%, by weight, based on the polymer, of potassium fluoride.

5. A composite article comprising cotton which has been impregnated with lead fluoride and then coated with a chloro-2-butadiene-1,3 polymer from a latex.

6. A composite article comprising a cellulose material, a chloro-2-butadiene-1,3 polymer composition in contact with the cellulose material, and a fluoride, capable of reacting with hydrochloric acid, so located within the article as to react with any hydrochloric acid evolved from said chloro-2-butadiene-1,3 polymer before substantial degradation of the cellulose material by such hydrochloric acid occurs.

7. A composite article comprising a cellulose material, a chloro-2-butadiene-1,3 polymer composition in contact with the cellulose material, and a fluoride, capable of reacting with hydrochloric acid, so located within the cellulose material as to react with any hydrochloric acid evolved from said chloro-2-butadiene-1,3 polymer before substantial degradation of the cellulose material by such hydrochloric acid occurs.

8. A composite article comprising a cellulose material, a chloro-2-butadiene-1,3 polymer composition in contact with the cellulose material, and a fluoride, capable of reacting with hydrochloric acid, so located within the chloro-2-butadiene-1,3 polymer composition as to react with any hydrochloric acid evolved from said chloro-2-butadiene-1,3 polymer before substantial degradation of the cellulose material by such hydrochloric acid occurs.

9. A composite article comprising a cellulose textile fabric impregnated with a fluoride capable of reacting with hydrochloric acid and a chloro-2-butadiene-1,3 polymer composition in contact therewith.

10. A composite article comprising a cellulose material, a chloro-2-butadiene-1,3 polymer composition in contact therewith, and a fluoride capable of reacting with hydrochloric acid substantially uniformly incorporated throughout the chloro-2-butadiene-1,3 polymer composition.

11. A composite article comprising a cellulose material, a chloro-2-butadiene-1,3 polymer composition in contact therewith, and substantially uniformly incorporated throughout the chloro-2-butadiene-1,3 polymer composition a fluoride capable of reacting with hydrochloric acid and a water-insoluble basic compound capable of reacting with hydrochloric acid.

12. A composite article comprising a cellulose textile fabric, a chloro-2-butadiene-1,3 polymer composition in contact therewith, and potassium fluoride substantially uniformly incorporated throughout said chloro-2-butadiene-1,3 polymer composition.

13. A composite article comprising a cellulose textile fabric, a chloro-2-butadiene-1,3 polymer composition in contact therewith, and sodium fluoride substantially uniformly incorporated throughout said chloro-2-butadiene-1,3 polymer composition.

14. A composite article comprising a cellulose textile fabric impregnated with lead fluoride and a chloro-2-butadiene-1,3 polymer composition in contact therewith.

15. A method for retarding the deterioration of a composite article comprising a cellulose material having a chloro-2-butadiene-1,3 polymer composition deposited upon it which comprises incorporating a fluoride capable of reacting with hydrochloric acid throughout the polymer composition prior to depositing the polymer composition upon the cellulose material.

HERBERT W. WALKER.